(12) United States Patent
Wu et al.

(10) Patent No.: US 7,724,781 B1
(45) Date of Patent: May 25, 2010

(54) RECEIVE VIRTUAL CONCATENATION PROCESSOR

(75) Inventors: Zhao Wu, San Jose, CA (US); Heng Liao, Belcarra (CA)

(73) Assignee: PMC-Sierra, Inc., Santa Clara, CA (US)

( * ) Notice: Subject to any disclaimer, the term of this patent is extended or adjusted under 35 U.S.C. 154(b) by 1585 days.

(21) Appl. No.: 10/232,962

(22) Filed: Aug. 30, 2002

Related U.S. Application Data

(60) Provisional application No. 60/316,375, filed on Aug. 30, 2001.

(51) Int. Cl.
*H04J 3/06* (2006.01)
*H04J 3/16* (2006.01)

(52) U.S. Cl. .................... 370/510; 370/542; 710/53

(58) Field of Classification Search ............ 370/464, 370/538, 539, 394, 541, 542, 543, 231, 510; 710/57
See application file for complete search history.

(56) References Cited

U.S. PATENT DOCUMENTS

| | | | |
|---|---|---|---|
| 4,625,308 A | | 11/1986 | Kim et al. |
| 4,769,790 A | * | 9/1988 | Yamashita ............ 365/189.12 |
| 5,033,044 A | | 7/1991 | Williams et al. |
| 5,461,622 A | | 10/1995 | Bleickardt et al. |
| 5,953,330 A | | 9/1999 | Canniff et al. |
| 6,449,292 B1 | | 9/2002 | Weeber |
| 6,453,944 B2 | | 9/2002 | Bartlett |
| 6,594,329 B1 | | 7/2003 | Susnow |
| 6,600,745 B1 | | 7/2003 | Chopping |
| 6,667,989 B1 | | 12/2003 | Sekii et al. |
| 6,731,656 B1 | | 5/2004 | Slater et al. |
| 6,750,687 B1 | | 6/2004 | Klecka, III |
| 6,751,238 B1 | | 6/2004 | Lipp et al. |
| 6,842,787 B2 | * | 1/2005 | Stadler et al. ............ 709/231 |
| 6,891,862 B1 | | 5/2005 | Brady et al. |
| 6,917,630 B1 | | 7/2005 | Russell et al. |
| 6,963,560 B2 | | 11/2005 | Sawey et al. |
| 6,999,470 B2 | | 2/2006 | Murton et al. |
| 7,298,744 B1 | | 11/2007 | Suh et al. |
| 7,394,828 B1 | | 7/2008 | Wu |
| 7,415,048 B2 | | 8/2008 | Wu |
| 2002/0001308 A1 | * | 1/2002 | Heuer ............... 370/386 |
| 2002/0064154 A1 | * | 5/2002 | Sharma et al. ........... 370/357 |

(Continued)

OTHER PUBLICATIONS

Gorshe, Steven, Contribution to T1 Standards Project "Revised Draft T105 SONET Base Standard", Oct. 20, 2000.*

(Continued)

*Primary Examiner*—Aung S Moe
*Assistant Examiner*—Habte Mered
(74) *Attorney, Agent, or Firm*—Townsend and Townsend and Crew LLP

(57) ABSTRACT

A receive virtual concatenation processor (processor) is adapted to receive time-slot interleaved data carried over SONET/SDH frames. The processor first generates per time-slot data and subsequently generates per channel data. The processor supports virtual concatenation, contiguous concatenation as well as mixed concatenation in which some channels are contiguously concatenated and others are virtually concatenated. The processor supports virtual concatenation at both STS-1 and STS-3c granularities and with arbitrary differential delay among constituent time-slots. The processor supports contiguous concatenation with any multiple of STS-3c granularity. The processor is highly scalable to support multiple channels and different frame sizes such as STS-12, STS-48, STS-192, etc.

19 Claims, 7 Drawing Sheets

U.S. PATENT DOCUMENTS

2002/0141456 A1    10/2002  Wang et al.
2002/0163922 A1*   11/2002  Dooley et al. .............. 370/412
2003/0007519 A1*    1/2003  Murton et al. ............. 370/539
2003/0026298 A1*    2/2003  Bisson et al. ............... 370/537
2005/0175004 A1*    8/2005  Russell et al. .............. 370/389
2006/0215553 A1     9/2006  Saitoh

OTHER PUBLICATIONS

Gorshe, Contribution to T1 Standards Project "Revised Draft T105 SONET Base Standard," Oct. 20, 2000, 124 pages.

Yur et al., "An Incremental Flow and Context-sensitive Pointer Aliasing Analysis," pp. 442-451, 1999, ICSE, Los Angeles CA.

Non-Final Office Action for U.S. Appl. No. 10/232,961, mailed on Dec. 28, 2006, 13 pages.

Response to Non-Final Office Action for U.S. Appl. No. 10/232,961, mailed on Jun. 15, 2007, 21 pages.

Final Office Action for U.S. Appl. No. 10/232,961, mailed on Sep. 10, 2007, 16 pages.

Response to Final Office Action for U.S. Appl. No. 10/232,961, mailed on Feb. 8, 2008, 18 pages.

Notice of Allowance for U.S. Appl. No. 10/232,961, mailed on Apr. 18, 2008, 8 pages.

Ex Parte Quayle Office Action for U.S. Appl. No. 10/233,306, mailed on Sep. 29, 2006, 5 pages.

Response After Ex Parte Quayle Office Action for U.S. Appl. No. 10/233,306, mailed on Jan. 4, 2007, 14 pages.

Notice of Allowance for U.S. Appl. No. 10/233,306, mailed on Mar. 16, 2007, 4 pages.

* cited by examiner

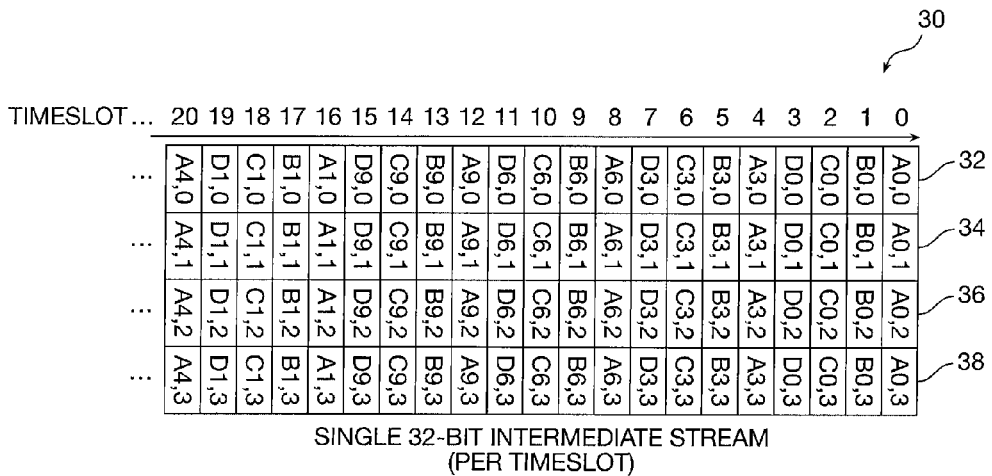
*FIG. 2C*
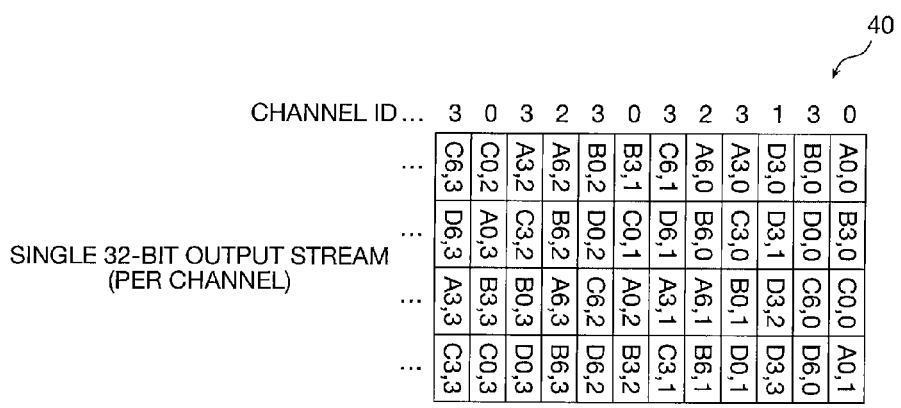
*FIG. 2D*
| CHANNEL | 0 | | | 1 | 2 | | 3 | | | | |
|---|---|---|---|---|---|---|---|---|---|---|---|
| BANDWIDTH | STS-1-3v | | | STS-1-1v | STS-1-2v | | STS-1-6v | | | | |
| TIMESLOT | 0 | 5 | 2 | 7 | 8 | 9 | 1 | 3 | 10 | 11 | 4 | 6 |
| DATA | A0,0 | B3,0 | C0,0 | D3,0 | A6,0 | B6,0 | B0,0 | D0,0 | C6,0 | D6,0 | A3,0 | C3,0 |
| | A0,1 | B3,1 | C0,1 | D3,1 | A6,1 | B6,1 | B0,1 | D0,1 | C6,1 | D6,1 | A3,1 | C3,1 |
| | A0,2 | B3,2 | C0,2 | D3,2 | A6,2 | B6,2 | B0,2 | D0,2 | C6,2 | D6,2 | A3,2 | C3,2 |
| | A0,3 | B3,3 | C0,3 | D3,3 | A6,3 | B6,3 | B0,3 | D0,3 | C6,3 | D6,3 | A3,3 | C3,3 |
*FIG. 3*

| CYCLE | 1 | 2 | 3 | 4 | 5 | 6 | 7 | 8 | 9 | 10 | 11 | 12 |
|---|---|---|---|---|---|---|---|---|---|---|---|---|
| CHANNEL ID | 0 | 3 | 1 | 3 | 2 | 3 | 0 | 3 | 2 | 3 | 0 | 3 |
FIG. 4
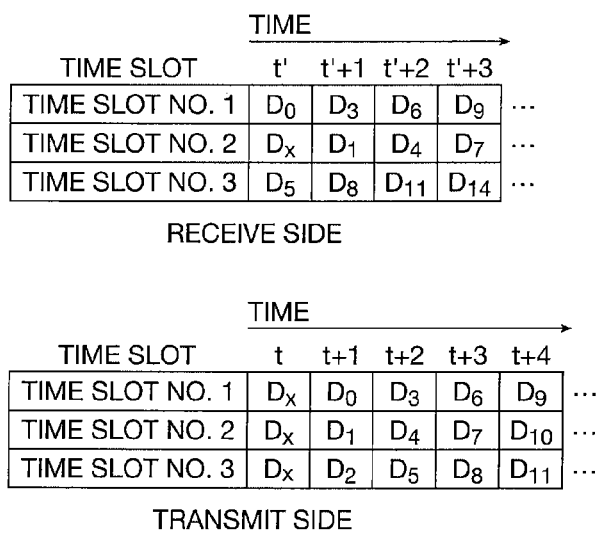
FIG. 5
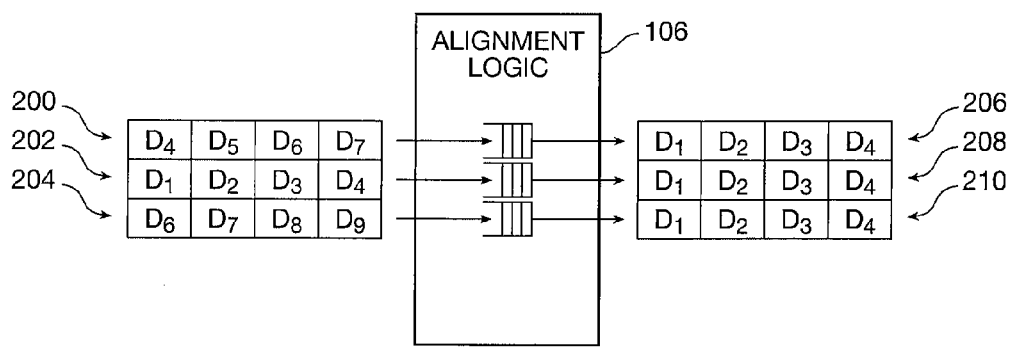
FIG. 9

RECEIVE VIRTUAL CONCATENATION PROCESSOR

CROSS-REFERENCES TO RELATED APPLICATIONS

The present application claims priority from the U.S. provisional patent application Ser. No. 60/316,375, filed Aug. 30, 2001 and entitled "RECEIVE VIRTUAL CONCATENATION PROCESSOR", the content of which is herein incorporated by reference in its entirety.

The present application is also related to the following U.S. patent applications, the contents of each of which is herein incorporated by reference in its entirety:

U.S. patent application Ser. No. 09/943,386, filed Aug. 30, 2001, and entitled "TRANSMIT VIRTUAL CONCATENATION PROCESSOR", U.S. patent application Ser. No. 10/126,466, filed Apr. 19, 2002, and entitled "DATA STREAM PERMUTATION APPLICABLE TO LARGE DIMENSIONS".

The present application is also related to copending application Ser. No. 10/233,306, entitled "DATA FORMAT CONVERSION FOR VIRTUAL CONCATENATION PROCESSING", filed contemporaneously herewith, and copending application Ser. No. 10/232,961, entitled "DIFFERENTIAL DELAY COMPENSATION", filed contemporaneously herewith, both assigned to the same assignee, and both incorporated herein by reference in their entirety.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates to communications network, and more particularly to concatenation of channels in a communications network.

Demand for high performance communication networks capable of transporting multiple types of data, such as text, audio and video data, is on the rise. To carry greater amount of data over existing communication channels, such as fiber-optic communication channels, network carriers are increasingly using high bandwidth technologies, such as wave division multiplexing (WDM) and optical carrier (OC) level 48. Such communication networks rely upon high-performance packet switches, such as asynchronous transfer mode (ATM) switches, frame relay switches and internet protocol (IP) routers which route the incoming packets to their desired destinations.

A commonly known standard referred to as synchronous optical network (SONET) defines a synchronous frame structure for transmitting signals using time division multiplexing. The basic building block of a SONET frame, commonly referred to as synchronous transport signal-1 (STS-1) includes 810 bytes that are transmitted every 125 µsec. Therefore a SONET channel carrying STS-1 frames (i.e., an STS-1 pipe) has a bit rate of 51.84 Mb/s, which has a corresponding optical signal referred to as OC-1.

Many STS-1 pipes may be contiguously concatenated to achieve higher bandwidths. For example, three STS-1 pipes may be contiguously concatenated to transmit three STS-1 frames, thus to achieve a bit rate of 155.52 Mb/s. In the following, the designation -Nc (N is an integer) appended to STS indicates the number of STS-1 pipes that are contiguously concatenated. For example, STS-3c indicates contiguous concatenation of three STS-1 pipes. In a similar manner, STS-12c indicates contiguous concatenation of twelve STS-1 pipes.

STS-1 or STS-Nc frames transported over contiguously concatenated pipes travel as a single unit with the granularity of the larger concatenated pipes. For example, in a STS-12c traffic—which signifies concatenation of 12 STS-1 pipes—adding or dropping of data by add/drop multiplexers are carried out at 12c granularity. The higher granularity simplifies such tasks as error control, performance control and error monitoring of the contiguously concatenated data. Many smaller pipes may be concatenated to form a larger pipe. For example, to form a STS-12c pipe, either twelve STS-1 or four STS-3c may be concatenated. In contiguous concatenation, data carried in time-slots associated with the smaller pipes travel through the same paths and thus have substantially similar propagation delays. For example, all STS-1 frames of a contiguously concatenated STS-12c travel through the same path.

The number of pipes that may be contiguously concatenated is typically limited to integer multiples of four STS-3c pipes, e.g. STS-12c, STS-48c, STS-192c, etc. Consequently, if a user desires to transmit data at, e.g., five times the bandwidth of an STS-1 pipe (i.e., at STS-5c), the user is required to use a STS-12c pipe or higher. This results in inefficient and wasteful use of bandwidth and thus increases cost. Furthermore, many of networking devices currently deployed, such as add/drop multiplexers, only operate at the STS-1 or STS-3c levels. Therefore, even if, for example, STS-12c is allowed by the standards, because associated frames of such a pipe travel together as a bundle, every networking device disposed between the transmitting and the receiving end of such a pipe is required to process these frames at the 12-c level. Therefore, to the extent that many of the currently deployed networking devices are adapted to operate at STS-1 or STS-3c levels only, they are unable to handle STS-12c data frames, thus rendering such concatenated pipes ineffective.

To more efficiently utilize the SONET/SDH bandwidth, virtual concatenation has been developed. Virtual concatenation is defined, in part, by the ANSI T1-X1.5, which is an evolving standard. In accordance with the virtual concatenation, any number of smaller STS-1 or STS-3c pipes may be grouped together to form a larger pipe. For example, three STS-1 pipes may be virtually concatenated to form a STS-1-3v pipe. In the following, it is understood that -Nv (N is an integer) appended to either STS-1 or STS-3c designates the number of respective channels that are virtually concatenated. For example, STS-1-12v designates virtual concatenation of twelve STS-1 pipes. Similarly, STS-3c-16v designates virtual concatenation of sixteen STS-3c pipes.

In virtual concatenation, data carried in time-slots associated with the smaller pipes may travel through different paths with different propagation delays. Synchronization is maintained between the transmitting end and the receiving end such that the virtually concatenated channels appear as contiguously concatenated channels. Because virtual concatenation enables concatenation of any number of smaller pipes, it overcomes some of the above described problems associated with contiguously concatenated pipes. For example, virtual concatenation enables forming a STS-1-5v pipe which, as described above, does not have a contiguously concatenated counterpart pipe, i.e., there is no STS-5c pipe. Moreover, because in virtual concatenation, the basic building blocks STS-1 or STS-3c, i.e., the frames with the lowest granularity, are not bundled together, they are readily supported by currently deployed networking devices.

BRIEF SUMMARY OF THE INVENTION

A receive virtual concatenation processor (RVCP) is adapted to receive time-slot interleaved bytes of SONET/SDH frames associated with channels that are concatenated. In response, the RVCP de-multiplexes the received time-slot interleaved data to first generate per time-slot data and subsequently to generate and supply per channel data as defined by an associated programmable calendar.

The RVCP is adapted to de-map time-slot interleaved data bytes generated from a number of different channels and carried via SONET frames of various sizes such as STS-12, STS-48, STS-192, STS-768 and thus is highly scalable. In other words, the RVCP is adapted to process STS-N traffic, where N is any multiple four of STS-12 traffic, e.g., STS-48, STS-192, STS-768, etc.

The RVCP supports both virtual and contiguous concatenation. The RVCP is adapted to de-map per time-slot data received from virtually concatenated channels with any channel mapping at both STS-1 and STS-3c granularities. Accordingly, the RVCP de-maps data from any number of channels that are virtually concatenated. Data from each channel of the virtually concatenated channels is mapped to a number of STS-1 or STS-3c time-slots forming either STS-1-Xv or STS-3c-Xv traffic, where X is an integer.

The RVCP is also adapted to de-map time-slot interleaved data received from contiguously concatenated channels whose data may be mapped to any multiple of STS-3c traffic, e.g., STS-6c, STS-9c, STS-12c, STS-48c, STS-192c. Furthermore, the RVCP supports mixed concatenation in which some channels are contiguously concatenated and others are virtually concatenated. Data for all the channels is supplied to the RVCP via a STS-N frame and through a parallel Telecombus.

The RVCP is adapted to include circuitry that aligns the time-slots of the data it receives in one or more stages. During the first alignment stage, the time-slots of the time-slot interleaved data that are misaligned by less than a predefined value are aligned before the RVCP generates per time-slot data. During the second alignment stage, The time-slots of the per time-slot data that are misaligned by more than the predefined value and thus are not aligned during the first alignment stage are aligned before the RVCP generates per channel data from the per time-slot data.

BRIEF DESCRIPTION OF THE DRAWINGS

FIG. 2A shows a multitude of time-slots of an STS-48 frame carrying data received by a receive virtual concatenation processor, in accordance with another exemplary embodiment of the present invention.

FIG. 2B shows four separate data streams of time-slot interleaved bytes occupying the time-slots of FIG. 2A, as received by the receive virtual concatenation processor.

FIG. 2C shows per time-slot data generated by the receive virtual concatenation processor in response to receipt of time-slot interleaved data of FIG. 2B.

FIG. 2D shows the per channel data generated by the receive virtual concatenation processor in response to receipt of time-slot interleaved data of FIG. 2B.

FIG. 3 shows mappings for each of the channels streaming data, as shown in FIG. 2B-2D.

FIG. 4 shows a calendar setting for each of the channels streaming data, as shown in FIGS. 2B-2D.

FIG. 5 shows the delay experienced by some of the time-slot as they are transmitted from the transmitter to the receiver of a network.

FIG. 9 shows data associated with three constituent time-slots of a virtually concatenated channels at input and output terminals of an alignment logic disposed in the receive virtual concatenation processor of FIG. 6.

DETAILED DESCRIPTION OF THE INVENTION

A receive virtual concatenation processor (RVCP), in accordance with one embodiment of the present invention, is adapted to receive time-slot interleaved bytes of SONET/SDH (hereinafter collectively refereed to as SONET) frames associated with channels that are virtually concatenated. In response, the RVCP de-multiplexes (alternatively referred to hereinbelow as de-map) the received data and supplies per channel data as defined by an associated programmable calendar.

The RVCP is highly scalable and is adapted to de-map time-slot interleaved data bytes generated from a number of different channels and carried via SONET frames of various sizes such as STS-12, STS-48, STS-192, STS-768. In other words, the RVCP is adapted to process STS-N traffic, where N is any multiple four of STS-12 traffic, e.g., STS-48, STS-192, STS-768, etc.

The RVCP supports both virtual and contiguous concatenation. The RVCP is adapted to de-map channelized data received from virtually concatenated channels with any channel mapping at both STS-1 and STS-3c granularities. Accordingly, the RVCP de-maps data from any number of channels that are virtually concatenated. Data from each channel of virtually concatenated channels is mapped to a number of STS-1 or STS-3c time-slots forming either STS-1-Xv or STS-3c-Xv traffic, where X is an integer.

The RVCP is also adapted to de-map channelized data received from contiguously concatenated channels whose data may be mapped to any multiple integers of STS-3c traffic, e.g., STS-6c, STS-9c, STS-12c, STS-15c, . . . , STS-48c, STS-192c. Furthermore, the RVCP supports mixed concatenation in which some channels are contiguously concatenated and others are virtually concatenated. Data for all the channels is supplied to the RVCP via a STS-N frame and through a parallel Telecombus. The RVCP is adapted to receive incoming time-slot interleaved data bytes, each of which has an associated time-slot, to de-map the received data, and to supply per-channel data at its output terminal, as described further below.

Figure 1:
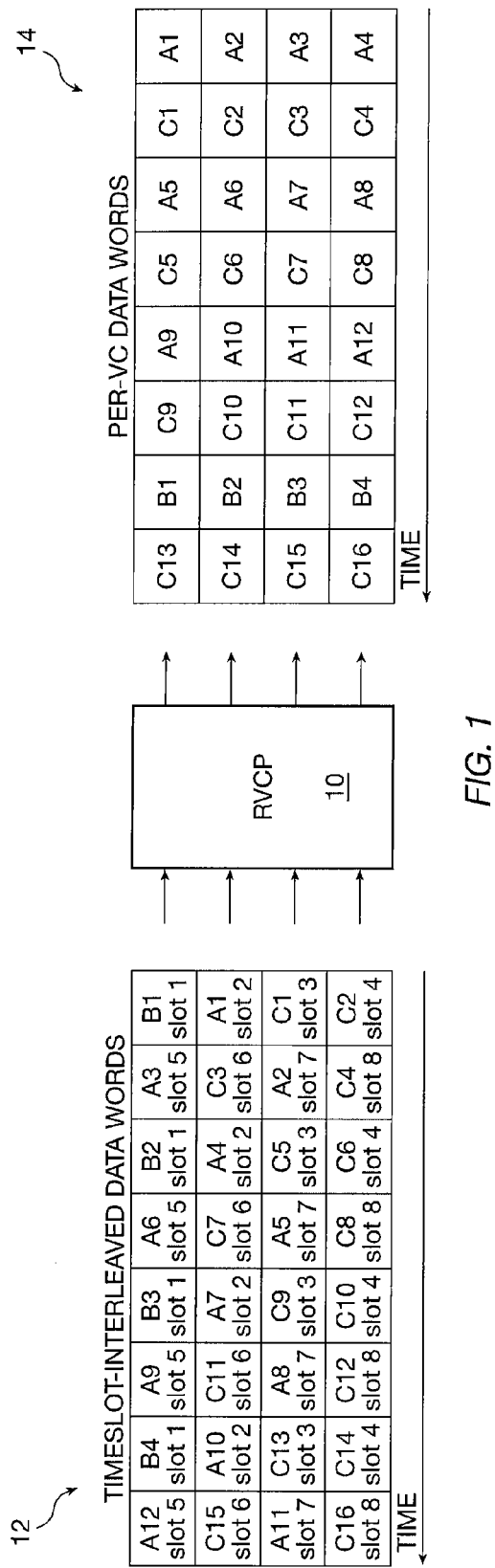
FIG. 1 shows mapping of time-slot interleaved data bytes of an STS-8 frame to per channel data as performed by a receive virtual concatenation processor, in accordance with one exemplary embodiment of the present invention.

FIG. 1 illustrates, by way of an example, the time-slot interleaved data received by an exemplary embodiment of an RVCP 10, as well as the per-channel data that is supplied by RVCP 10. RVCP 10 is shown as having four input terminals and four output terminals. In accordance with the example shown in FIG. 1, three virtual channels A, B and C are mapped into an STS-8 frame whose bytes are delivered to RVCP 10 via a 4-byte wide data path. It is understood, however, that data may be delivered to RVCP 10 via a wider, e.g., 8, or narrower data path, e.g., 2. Each input terminal of RVCP 10 receives a different byte of the data. The data delivered to RVCP 10 is shown in data array 12 of FIG. 1.

In the example shown in FIG. 1, three channels are shown, namely channels A, B and C. Each of these channels has a stream of data multiplexed over a number of time-slots and in accordance with the virtual concatenation stetting. For example, Channel A is adapted to deliver STS-1-3v traffic at time-slots 2, 7 and 5 of the STS-8 frame. Channel B is adapted to deliver STS-1 traffic at time-slot 1 of the STS-8 frame. Channel C is adapted to deliver STS-1-4v traffic at time-slots 3, 4, 6 and 8 of the STS-8 frame. As shown in data array 12 of FIG. 1, data bytes A1, A2 and A3 respectively arrive at time-slots 2, 7 and 5, data byte B1 arrives at time-slot 1, and data bytes C1, C2, C3 and C4 respectively arrive at time-slots 3, 4, 6 and 8. Accordingly, RVCP 10 de-maps data byte A1 from time-slot 2, data byte A2 from time-slot 7, and date byte A3 from time-slot 5. Similarly, RVCP 10 de-maps data byte B1 from time-slot 1, data byte C1 from time-slot 3, data byte C2 from time-slot 4, data byte C3 from time-slot 6 and data byte C4 from time-slot 8. Thereafter, RVCP 10 de-maps data byte A4 from time-slot 2 of the next STS-8 column, data byte A5 from time-slot 7 of the next STS-8 column, and date byte A6 from time-slot 5 of the next STS-8 column, etc.

The per channel data de-mapped by RVCP 10 appears at its output terminals and in the order shown in data array 14 of FIG. 1. As seen from data arrays 12 and 14, at each cycle of clock, four time-slot interleaved data bytes are received by RVCP 10 and four data bytes associated with one of the channels is supplied by RVCP 10. For example, in cycle 1 data bytes A1, A2, A3 and A4 are supplied by RVCP 10. In cycle 2, data bytes C1, C2, C3 and C4 are supplied by RVCP 10. The order in which the data bytes are de-mapped and appear at the output terminals of RVCP 10 is defined by a programmable calendar, as understood by those skilled in the art.

Data bytes occupying different time-slots of the same channel (hereinafter alternatively referred to as constituent time-slots) may experience different delays as they travel through their path. To compensate for such delays, RVCP 10 includes an internal memory that stores the received data bytes. RVCP 10 also includes associated hardware modules that extract multi-frame indicator from the frame overhead bytes. In some embodiments, the internal memory is operative to compensates for 125 μs delay between constituent time-slots. It is understood, however, that in other embodiments the internal memory is operative to compensate for more or less than 125 μs delay.

To increase the amount of propagation delay that RVCP 10 is adapted to compensate for, RVCP is adapted to include an interface module operative to store data in and retrieve data from an external memory. In some embodiments, RVCP 10 in communication with such an external memory is adapted to compensate 50 msec of differential delay that may occur between constituent time-slots. In some embodiments, the external memory may be a quad data rate (QDR) static random access memory (SRAM). In yet other embodiments, RVCP 10's memory interface module is adapted to store data in and retrieve data from, e.g., double data rate (DDR) SRAMs or DRAMs or any other memory adapted to provide random access to, e.g., a word or a block of words stored therein.

FIGS. 2A, 2B, 2C and 2D collectively show another example of conversion of data—received via virtually concatenated channels—from time-slot interleaved data to per-channel data, in accordance with one embodiment of the present invention. The RVCP of this exemplary embodiment is adapted to receive four separate streams of byte-wide input data, namely data streams A, B, C and D, each of which is an STS-12/STM-4 stream. The data bytes carried by each stream are interleaved in accordance with the Telecombus time-slots as defined by the ANSI standard. For example, the data bytes in stream A are received in the following order: $\{A_{0,0}\ A_{3,0}\ A_{6,0}\ A_{9,0}\ A_{1,0}\ A_{4,0}\ A_{7,0}\ A_{10,0}\ A_{2,0}\ A_{5,0}\ A_{8,0}$ and $A_{11,0}\}$. In the notation $A_{x,y}$, the first index x refers to the SONET/SDH time-slot within the STS-12/STM-4 stream, and the second index y refers to the column group within the stream. For STS-48/STM-16, one column group consists of 48 time-slots.

Figure 2A:
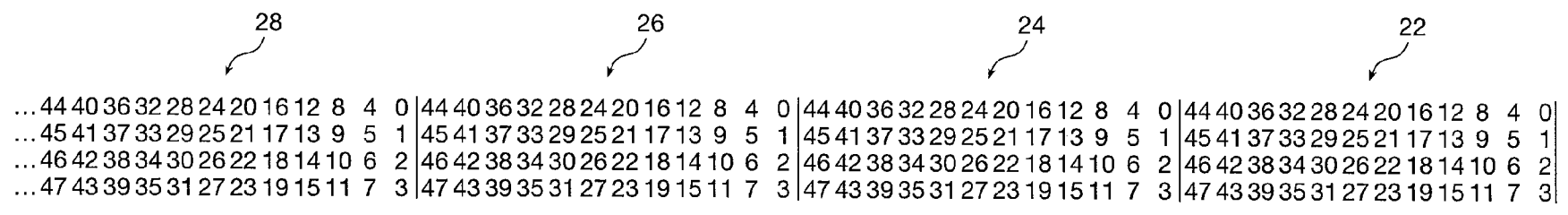
Figure 2B:
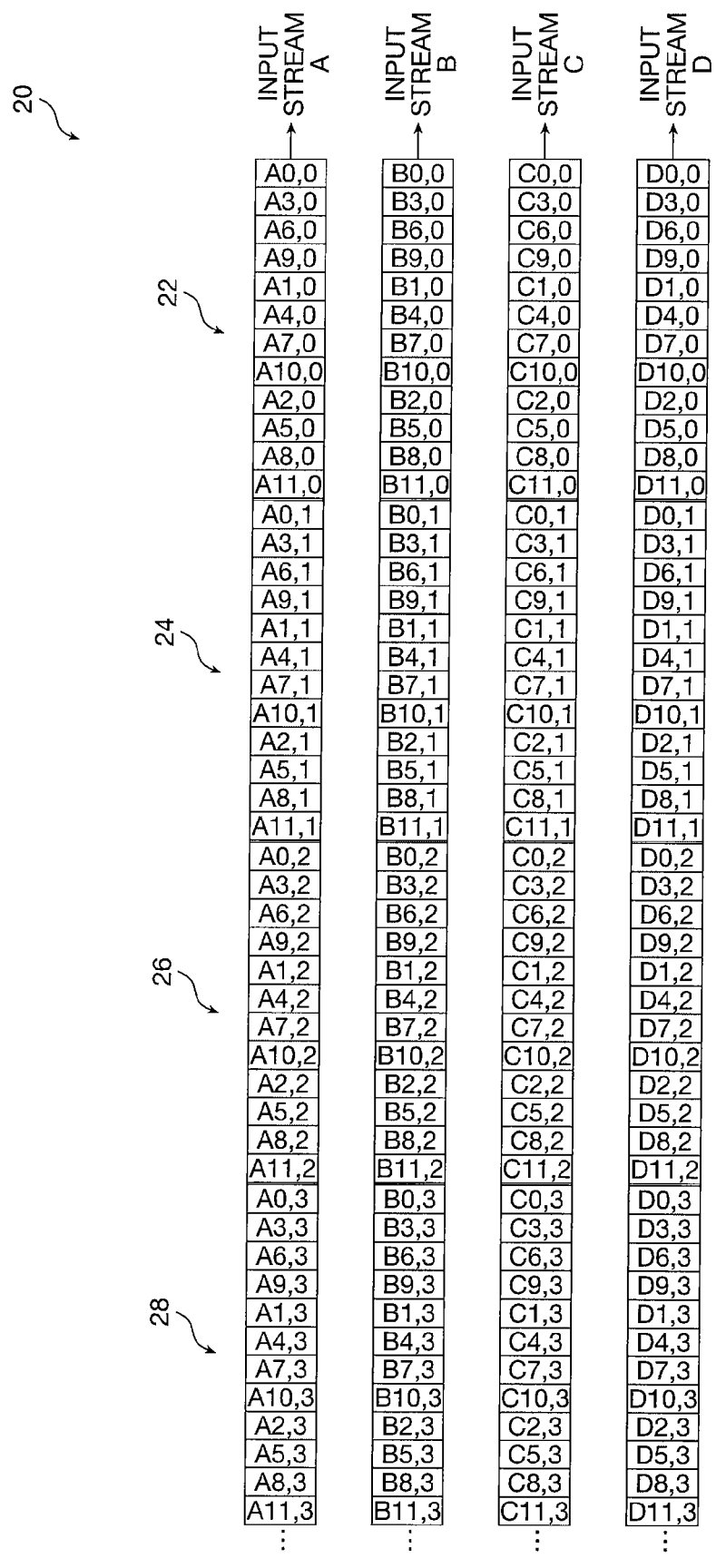

FIGS. 2A and 2B show four separate arrays 22, 24, 26 and 28 each having 48 time-slots. These time-slots are shown in FIG. 2A as time-slots 0 through 47. In FIG. 2B, each of the time-slots is shown as being occupied by an associated data byte. For example, data byte $A_{0,0}$ occupies time-slot 0, data byte $B_{9,0}$ occupies time-slots 13, and data byte $D_{11,0}$ occupies time-slot 47. Because the data-path of the RVCP of this exemplary embodiment is 4 bytes wide, as seen from FIG. 2B with each clock cycle data from four time-slots are received by the RVCP. For example, during clock cycle 1, data bytes $A_{0,0}\ B_{0,0}\ C_{0,0}$ and $D_{0,0}$, which respectively occupy time-slots 0, 1, 2 and 3 are received by the RVCP. During clock cycle 4, data bytes $A_{9,0}\ B_{9,0}\ C_{9,0}$ and $D_{9,0}$ which respectively occupy time-slots 12, 13, 14 and 15 are received by the RVCP. Similarly, during clock cycle 12, data bytes $A_{11,0}\ B_{11,0}\ C_{11,0}$ and $D_{11,0}$ which respectively occupy time-slots 44, 45, 46 and 47 are received by the RVCP.

As seen from FIGS. 2A and 2B, data bytes received by the RVCP are time-slot interleaved. For example, during the first cycle, payload bytes from time slots 0, 1 2 and 3 are received. Similarly, during the second clock cycle, payload bytes from time slots 4, 5, 6 and 7 are received. In accordance with the present invention, to align data from constituent time-slots, the RVCP first stores an intermediate data format in the internal differential delay buffer or external differential delay buffer; this intermediate format is referred to hereinbelow as per time-slot format. For example, during the first clock cycle, only the payload bytes from time slot 0 are supplied. Similarly, during the second clock cycle, only the payload bytes from time slot 1 are supplied. FIG. 2C is the per time-slot data generated by the RVCP after it deinterleaves the time-slot interleaved data it receives. For simplicity, only the data associated with the first twenty time-slots are shown in FIG. 2C.

As seen from FIGS. 2A, 2B and 2C, all data bytes associated with, for example, stream A and that belong to the same time-slot of the various arrays are disposed in that slot. For example, data bytes $A_{0,0}, A_{0,1}, A_{0,2}$, and $A_{0,3}$—which occupy time-slot 0 of respective data arrays 22, 24, 26 and 28—are disposed in time-slot 0 of the per time-slot data shown in FIG. 2C. Similarly, for example, data bytes $B_{9,0}, B_{9,1}, B_{9,2}$, and $B_{9,3}$—which occupy time-slot 13 of respective data arrays 22, 24, 26 and 28—are disposed in time-slot 13 of the per time-slot data shown in FIG. 2C.

After converting the data from time-slot interleaved to per time-slot, the RVCP generates per channel data that the RVCP transfers to its output terminals. FIG. 2D shows the per channel data supplied by the RVCP for some of the data bytes that it receives. Also shown in FIG. 2D is the channel number associated with each per channel data. The order in which each data byte is delivered by the RVCP to the channels designated in FIG. 2D, is defined, in part, by a channel mapping table 50 shown in FIG. 3 and a calendar 60 shown in FIG. 4. Therefore, to aid in understanding the per channel data of FIG. 2D, concurrent references to FIGS. 2C, 2D, 3 and 4 is made below.

In accordance with calendar 60, during cycle 1 data associated with channel 0 is supplied by the RVCP; during cycle 2 data associated with channel 3 is supplied, etc. As seen from FIG. 2D, the first 4 bytes of data, namely data bytes $A_{0,0}$, $B_{3,0}$, $C_{0,0}$, and $A_{0,1}$ are associated with and delivered by the RVCP to channel 0. The second four bytes of data, namely data bytes $B_{0,0}$, $D_{0,0}$, $C_{6,0}$, and $D_{6,0}$ are associated with and delivered by the RVCP to channel 3. The RVCP discards the section, line, and path overhead bytes as well as fixed stuff of the SONET/SDH frames that it receives.

In accordance with channel mapping table 50, data in channel 0 is formed from three virtually concatenated STS-1 streams (i.e., STS-1-3v) occupying time-slots 0, 5 and 2. Data in channel 1 is formed from one STS-1 stream occupying time-slot 7. Data in channel 2 is formed from two virtually concatenated STS-1 streams (i.e., STS-1-2v) occupying time-slots 8 and 9. Similarly, data in channel 2 is formed from six virtually concatenated STS-1 frames (i.e., STS-1-6v) occupying time-slots 1, 3, 10, 11, 4 and 6. It is understood that the order of the time-slots in each channel defines the order in which data bytes are supplied by the RVCP.

The data in channel mapping table 50 of FIG. 3 is formed in accordance with the per time-slot data shown in FIG. 2C, and as described further below. FIG. 3 shows only four rows of data of channel mapping table 50, namely rows 52, 54, 56 and 58. It is understood, however, that table 50 includes 12 more rows (not shown).

As seen from data array 30 of FIG. 2C, the first group of data bytes in time-slots 0, 5 and 2 shown in row 32 of FIG. 2C, are $A_{0,0}$, $B_{3,0}$ and $C_{0,0}$. Accordingly, data bytes $A_{0,0}$, $B_{3,0}$ and $C_{0,0}$ are also shown as occupying time-slots 0, 5 and 2 of row 52 of table 50. The second group of data bytes in time-slots 0, 5 and 2 that are shown in row 34 of FIG. 2C, are $A_{0,1}$, $B_{3,1}$ and $C_{0,1}$. Accordingly, data bytes $A_{0,1}$, $B_{3,1}$ and $C_{0,1}$ are also shown as occupying time-slots 0, 5 and 2 of row 54 of table 50. Similarly, the third group of data bytes in time-slots 0, 5 and 2 that are shown in row 36 of FIG. 2C, are $A_{0,2}$, $B_{3,2}$ and $C_{0,2}$. Accordingly, data bytes $A_{0,2}$, $B_{3,2}$ and $C_{0,2}$ are also shown as occupying time-slots 0, 5 and 2 of row 56 of table 50. In a similar manner, data bytes $A_{0,3}$, $B_{3,3}$ and $C_{0,3}$ occupy time-slots 0, 5 and 2 of row 50 of table 50.

The first, second, third and fourth data bytes in time-slot 7 in data array 30 are $D_{3,0}$, $D_{3,1}$, $D_{3,2}$ and $D_{3,3}$—respectively positioned in rows 32, 34, 36 and 38. Accordingly, these data bytes also fill time-slot 7 in rows 52, 54, 56 and 58 of table 50. Data in time-slots 8, 9, 1, 3, 10, 11, 4 and 6 of table 50 similarly correspond to those in data array 30 and thus are not described below.

FIG. 4 is a calendar 60 in accordance with which data for each of the channels 0, 1, 2 and 3 is supplied by the RVCP. For example, in cycle 1 data associated with channel 1 is supplied by the RVCP; in cycle 2 data associated with channel 3 is supplied by the RVCP; etc. Because in this exemplary embodiment, the RVCP has a 32-bit data path, in each clock cycle the RVCP supplies four bytes of data at its output terminals. As seen from table 50, the first four bytes of data associated with channel 0 and in the designated time-slot order of (0, 5, 2) are $A_{0,0}$, $B_{3,0}$, $C_{0,0}$ and $A_{0,1}$. Therefore, during cycle 1 data bytes $A_{0,0}$, $B_{3,0}$, $C_{0,0}$ and $A_{0,1}$ associated with channel 0 are delivered by the RVCP to channel 0. Data array 40 of FIG. 2D shows the per channel data bytes delivered by the RVCP during each clock cycle.

During cycle 2, the RVCP delivers data associated with channel 3 and in the designated time-slot order of (1, 3, 10, 11, 4, 6). Therefore, during cycle 2, data bytes $B_{0,0}$, $D_{0,0}$, $C_{6,0}$ and $D_{6,0}$ associated with channel 3 are delivered by the RVCP, as is also shown in data array 40.

During cycle 3, the RVCP delivers data bytes associated with channel 1. Therefore, during cycle 3, data bytes $D_{3,0}$, $D_{3,1}$, $D_{3,2}$ and $D_{3,3}$ associated with channel 1 are delivered by the RVCP, as is also shown in data array 40.

During cycle 4, the RVCP delivers data bytes associated with channel 3. Therefore, during cycle 4, data bytes $A_{3,0}$, $C_{3,0}$, $B_{0,1}$ and $D_{0,1}$ associated with channel 3 are delivered by the RVCP, as is also shown in data array 40. The remaining per channel data bytes as supplied by the RVCP and associated with each channel are shown in FIG. 2D.

Although the above exemplary embodiment describes de-mapping of four STS-1-Xv channels which span over 12 time-slots in an STS-48 frame, it is understood that the present invention is adapted to de-map data bytes associated with, for example, any number of STS-1-Xv and STS-3c-Xv channels from an STS-N frame, in which case each STS-3c time-slot corresponds to three STS-1 time-slots. The present invention is similarly adapted to de-map frames carrying data over contiguously concatenation channels where the constituent time-slots are contiguous.

As described above, in virtual concatenation a number of, for example, STS-1 or STS-3c time-slots are grouped together to form a virtual channel. Each such time-slot may travel via a separate physical path with a different propagation delay. Therefore, when the constituent time-slots arrive at the RVCP, they may be out of alignment. For example, in FIG. 5, a stream of data bytes is transferred across three time-slots associated with STS-1-3v or STS-3c-3v. The data bytes transmitted by the sender are aligned, but may not be aligned when received by the RCVP. In FIG. 5, the bytes occupying the first time-slot arrives one clock cycle earlier than the bytes occupying the second time-slot and one clock cycle later than the bytes occupying the third time-slot. For example, both data $D_3$ and $D_1$ which respectively occupy time-slots 1 and 2 are received at time t'+1. However, data $D_3$ is transmitted in time-slot 1 at time t+2, while data $D_1$ is transmitted in time-slot 2 at time t+1. Therefore, even though data $D_1$ is transmitted earlier than data $D_3$, it is received at the same time as $D_3$.

In accordance with one aspect of the present invention, a buffer in the RVCP is adapted to account for any differential delays that data bytes occupying different time-slots may experience as they move through the virtually concatenated channels. In some embodiments, the buffer is adapted to realign channel data with, for example, a maximum differential delay of one SONET/SDH frame which is 125 μs. Therefore, in some embodiments, the buffer is adapted to provide enough storage space to account for maximum experienced differential delays, as well as the bandwidth of the channel. For example, if the maximum differential delay associated with an STS-3c-7v channel is 1 ms, then the buffer capacity is 3×7×87×9×(1 ms/125 μs)=131,544 bytes.

In order to handle relatively larger differential delays, the RVCP is adapted to interface with an external memory. In some embodiments, such an RVCP interface is a glueless QDR SRAM interface, thereby enabling storage of up to 16 MB and enabling adjustment of up to 50 ms differential delays. In yet other embodiments, the RVCP includes an interface to communicate with an external DRAM adapted to transfer data in a block-mode.

The delay information of each time-slot in a SONET/SDH frame is encoded in the H4 byte of the path overhead. Table I below shows the sequence number and multi-frame indicator encoding of the H4 byte of the path overhead, as is known to those skilled in the art. As shown in Table I, the H4 byte carries the sequence number, the multi-frame indicator, and some reserved fields. Since these fields are encoded in the H4 byte in a serial format, it takes 16 frames to transfer the entire sequence number—which has 8 bits—and the multi-frame indicator—which has 12 bits.

TABLE I

| Bits 7-4 | Bits 3-0 (MFI[3:0]) | Multi-frame indicator (MFI) |
| --- | --- | --- |
| SQ[7:4] | 1110 | n − 2 |
| SQ[3:0] | 1111 | n − 1 |
| MFI[11:8] | 0000 | n |
| MFI[7:4] | 0001 | n + 1 |
| Reserved (0000) | 0010 | n + 2 |
| Reserved (0000) | 0011 | n + 3 |
| Reserved (0000) | 0100 | n + 4 |
| Reserved (0000) | 0101 | n + 5 |
| Reserved (0000) | 0110 | n + 6 |
| Reserved (0000) | 0111 | n + 7 |
| Reserved (0000) | 1000 | n + 8 |
| Reserved (0000) | 1001 | n + 9 |
| Reserved (0000) | 1010 | n + 10 |
| Reserved (0000) | 1011 | n + 11 |
| Reserved (0000) | 1100 | n + 12 |
| Reserved (0000) | 1101 | n + 13 |
| SQ[7:4] | 1110 | n + 14 |
| SQ[3:0] | 1111 | n + 15 |
| MFI[11:8] | 0000 | n + 16 |
| MFI[7:4] | 0001 | n + 17 |
| Reserved (0000) | 0010 | n + 18 |

Because the data sent out via virtually concatenated channels are aligned, the same multi-frame indicator is generated for all the constituent time-slots. However, when the RVCP receives data, the multi-frame indicator for constituent time-slots may no longer be aligned. Moreover, the cycle during which each time-slot receives the H4 byte is not necessarily the same. For example, assume that $D_x$ in FIG. 5 represents the H4 byte, then the three $D_x$s on the transmitting side all have the same multi-frame indicator. However, the H4 byte is aligned with data bytes on the receive side. For example, the H4 byte may be aligned with data bytes $D_0$ and $D_5$ received at time t' on the receive side.

To realign the three constituent time-slots, the RVCP is adapted to find the corresponding H4 byte with the same multi-frame indicator in the other two time-slots. Differential delay may be accounted for either before the data bytes are written in to the buffer or after the data bytes are written into the buffer. In one embodiment of the RVCP, the buffer is adapted to realign the data bytes as these data bytes are written to the buffer. In other words, the realignment of data occurs during the write cycle. In other embodiment, the buffer is adapted to realign the data bytes as these data bytes are read from the buffer.

The RVCP is further adapted to remove fixed stuff, overhead, and variations due to pointer adjustments in the time-slot interleaved data by storing data bytes for each time-slot into an array of small memories. In one embodiment, each small memory contains data for either an STS-1 or STS-3c time-slot. Bytes in each STS-12c time-slot are stored as four STS-3c queues. Bytes in each STS-24c time-slot are disposed in two banks each having four STS-3c queues. Similarly bytes in each STS-48c time-slot are disposed in four banks each having four STS-3c queues. Data from each small memory is read out one byte at a time.

Figure 6:
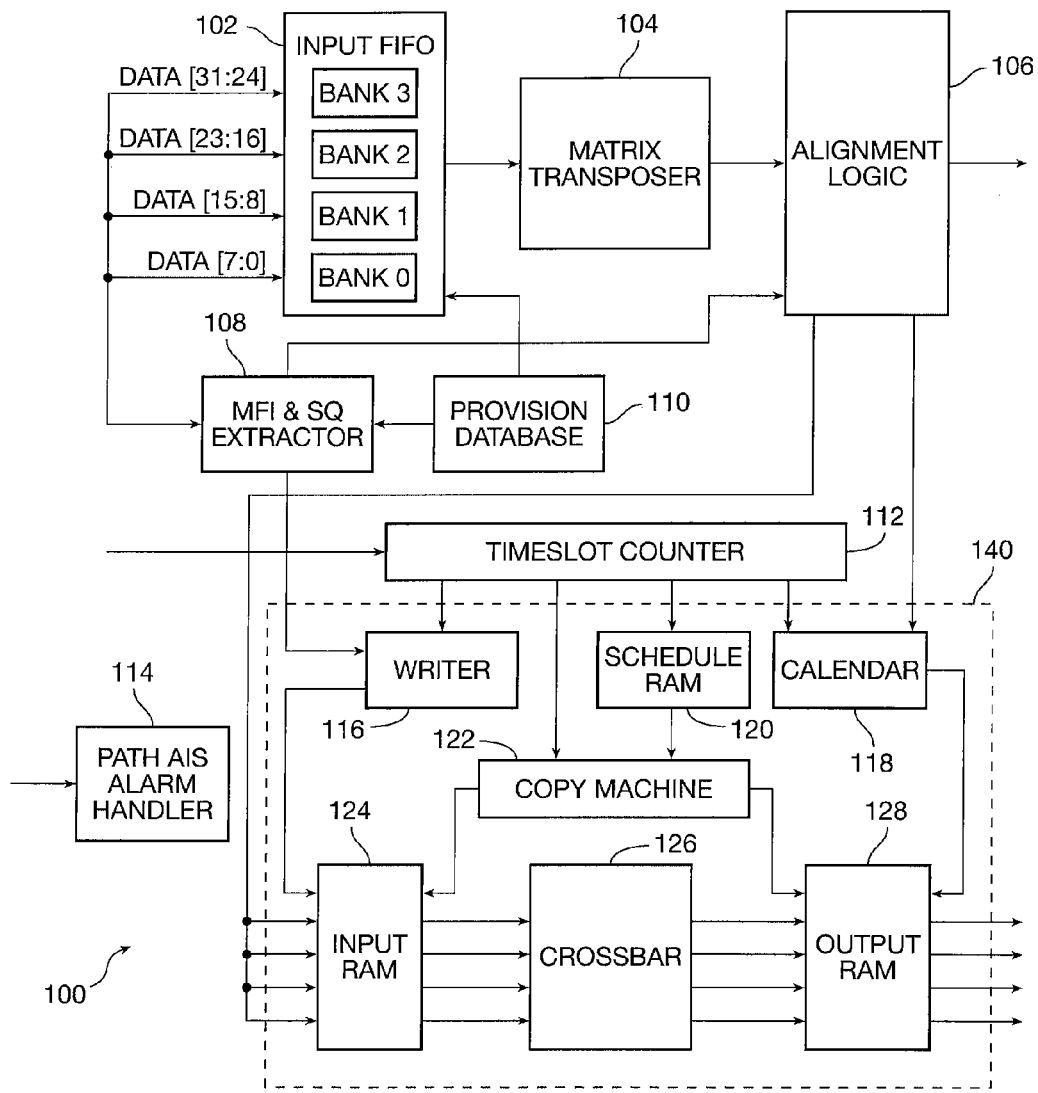
FIG. 6 is a simplified block diagram of various logic blocks disposed in the receive virtual concatenation processor, in accordance with one embodiment of the present invention.

FIG. 6 is a simplified block diagram of an exemplary RVCP 100 adapted to convert time-slot interleaved data that it receives via virtually concatenated channels to per time-slot data and subsequently to convert the per time-slot data to per-channel data. RVCP 100 is adapted to operate at STS-48 rate. However, it is understood that an RVCP, in accordance with the presents invention, may operate at lower rates, e.g. STS-12, or higher rates, e.g., STS-192 or STS-768. RVCP 100 includes, in part, an input buffer 102, a matrix transposer 104, an alignment logic 106, a multi-frame indicator and sequence number extractor (MFI&SQ) 108, a provision database 110, a time-slot counter 112, a path AIS alarm handler 114, a writer 116, a calendar 118, a schedule RAM 120, a copy machine 122, an input RAM 124, a cross bar 126 and an output RAM 128.

Writer 116, calendar 118, schedule RAM 120, copy machine 122, input RAM 124, cross bar 126 and output RAM 128 collectively form marriage network 140 which is described in U.S. patent application Ser. No. 10/126,466, filed Apr. 19, 2002, and entitled "DATA STREAM PERMUTATION APPLICABLE TO LARGE DIMENSIONS", the content of which is incorporated herein by reference in its entirety.

RVCP 100 is adapted to receive 32 bits of data, namely DATA[31:0] of SONET/SDH frames via a standard Telecombus Interface from the line side or the line interface. DATA [31:0] is transferred between various blocks of RVCP 100 in groups of four bytes, thereby enabling RVCP 100 to operate at 77.7 MHz. Calendar 118 and output RAM 128 may be connected to a Generic Frame Processor (GFP) or an HDLC Cell Frame Processor (CFP). Alignment logic 106 includes an interface adapted to communicate with an external QDR SRAM. A description of some of the blocks disposed in RVCP 100 follows.

Path AIS Alarm Handler

Path AIS alarm handler 114 services the AIS alarms for the upstream (i.e., incoming) SONET/SDH streams. When an upstream SONET/SDH device detect an error (e.g., framing errors, excessive pointer adjustment, loss of pointers, etc.), it will generate an AIS alarm for each erroneous time-slot. AIS alarm handler 114 responds to such errors by, for example, disabling data output for the associated channels on the system interface.

Matrix Transposer

Matrix transposer 104 reads the payload bytes associated with each time-slot and stored in input buffer 102 sequentially, i.e., one byte per clock cycle. In response, matrix transposer 104 supplies a 4-byte word associated with each time slot during a single clock cycle. Therefore, the payload bytes supplied by matrix transposer 104 are in per time-slot form.

Figure 7:
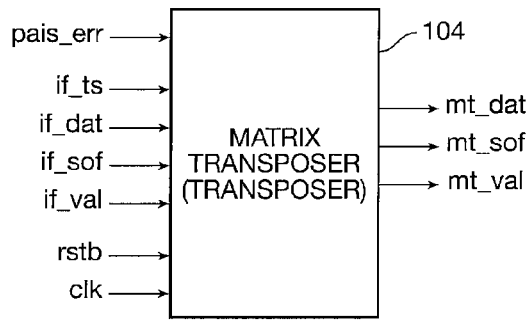
FIG. 7 shows various input/output signals of the matrix transposer of the receive virtual concatenation processor of FIG. 6.

FIG. 7 shows a block diagram of matrix transposer 104, hereinafter alternatively referred to as transposer 104. Transposer 104 receives, in part, a four-byte signal IF_DAT[31:0], a four-bit start-of-frame indicator signal IF_SOF[3:0] each bit indicating a start of frame indicator and a four-bit data valid flag signal IF_VAL[3:0]. Each bit of signal IF_VAL[3:0] is received from a different one of the four banks of input buffer 102. Signal IF_TS identifies the current time-slot.

Because transposer 104 receives four bytes of data for each time-slot and aggregates the four bytes as a single 32-bit word on signal MT_DAT[31:0], signal IF_TS is adapted to distinguish between time-slots 0 and 3 only. Output signal MT_SOF indicates whether the 32-bit word MT_DAT[31:0] includes the first data byte in an SONET Payload Envelope (SPE). If the 32-bit word MT_DAT[31:0] includes the first data byte in an SPE, that byte is carried via MT_DAT[31:24]. If input buffer 102 does not include four valid bytes for a particular time-slot, then transposer 104 does not output a valid data, in which case signal MT_VAL designates that both signals MT_DAT and MT_SOF are invalid. Input signal PAIS_ERR input indicates the presence of path AIS alarm on the time-slot pointed to by signal IF_TS. If there is a path AIS alarm and the path AIS alarm handler 114 is enabled, signal MT_VAL is invalidated. Signal RSTB resets the registers disposed in matrix transposer 104 and signal CLK is a clock signal.

Figure 8:
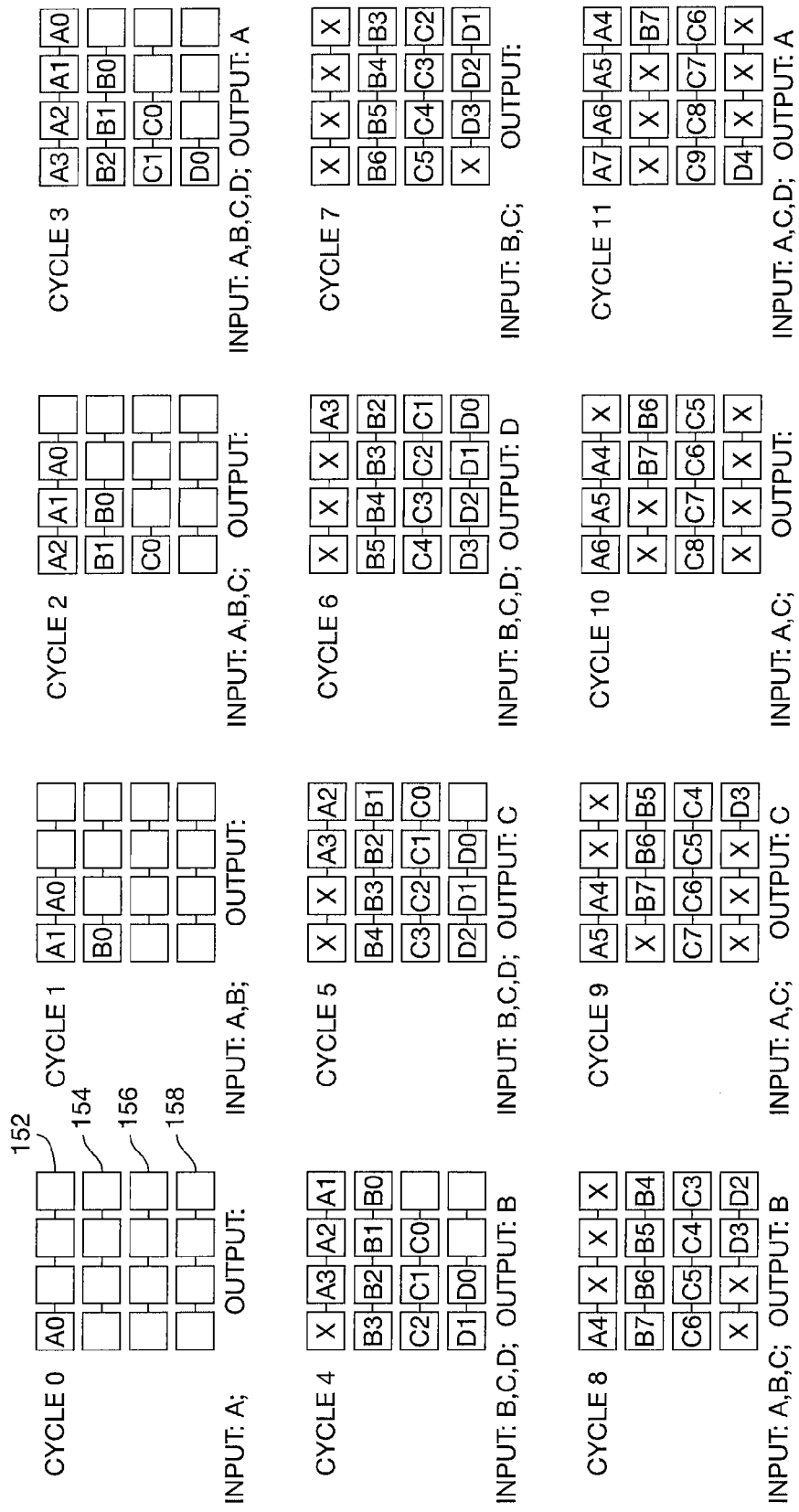
FIG. 8 shows movement of data bytes among various registers disposed in the matrix transposer of FIG. 7.

In one embodiment, the matrix transposer includes an array of registers to provide a delay network. For example, transposer 104 is shown in FIG. 8 as including four 8-bit four-stage shift registers 152, 154, 156 and 158. In FIG. 8, data bytes delivered from the four banks of input buffer 102 banks to shift registers 152, 154, 156, 158 are respectively designated as A, B, C and D. During every four clock cycles, transposer 12 receives up to four bytes of data from input buffer 102 (each byte is received from a different bank of the input buffer).

Conversion of data format from time-slot interleaved to per-time-slot data (see FIGS. 2B and 2C) is performed, in part, by shift registers 152, 154, 156, 158. Each of these shift registers is a serial-to-parallel shift register. Each of these shift registers thus serially reads in one byte of data per clock cycle from an associated input buffer 102 bank. When any of these shift registers has four bytes read in and is selected, it outputs its four bytes of data in one clock cycle. In some embodiments, the readout schedule for the input buffer banks is performed in accordance with a round-robin scheme. The readout is performed through 48 queues for STS-1 traffic, 16 queues for STS-3c traffic, and/or 4 queues for the STS-12c traffic; this results in timely and fair readout of all the queues. In some embodiments, the readout schedule for the shift registers is also based on a round-robin scheme.

FIG. 8 shows the data read in and read out of each of the shift registers 152, 154, 156 and 158 of transposer 104. During cycles 0 through 3, a first bank (not shown) of input buffer 102 delivers four bytes {A0, A1, A2, A3} to shift register 152. Therefore, during clock cycle 3, shift register 152 outputs 32-bit word {A0, A1, A2, A3}. During the next four cycles 4 through 7, no data is transferred from the first bank of input buffer 102 to shift register 152. Accordingly, no data is output from shift register 152 during clock cycle 7. During cycles 8 through 11, a second bank of input buffer 102 transfers four bytes of data to shift register 152, namely data bytes {A4, A5, A6, A7}. Accordingly, during clock cycle 11, shift resister 152 outputs 32-bit word {A4, A5, A6, A7}. In a similar manner, shift registers 154, 156 and 158 respectively store and deliver during different clock cycles the 32-bit data they receive from the second, third and fourth banks of input buffer 102. For example, shift register 154 stores and delivers (i.e., services) data during cycles 1-4, 5-8, 9-12. Shift register 156 services data during clock cycles 2-5, 6-9, etc.

If an input buffer 102 bank does not have four bytes stored therein, transposer invalidates the output four clock cycles later. Transposer 104 determines whether each input buffer 102 bank has four bytes stored therein before it reads out the four bytes from that bank (i.e., once every four cycles). Therefore, if an input buffer bank does not have four bytes at the time such a determination is made by transposer 104 but accumulated four bytes while data is read from other input buffer 104 banks, no data is transferred out from that bank until twelve cycles later.

MFI and SQ Extractor

Multi frame indicator (MFI) and sequence number (SQ) extractor 108 (collectively referred to hereinbelow as extractor 108) parses the H4 byte in the path overhead to extract the MFI and the SQ for each time-slot. Depending on the processing location, it takes many cycles for extractor 108 to from an MFI. Extractor 108 performs other functions such as detecting sequence numbers, MFI jump, etc.

In the exemplary embodiment described above, it takes extractor 108 up to sixteen frames to accumulate the multi-frame indicator and sequence number. Extractor 108 maintains one accumulator for each time-slot to gather the multi-frame indicator. Extractor 108 includes a state machine that keeps track of the bit accumulation for each MFI.

Provision Database

Provision database 110 includes two RAMs, namely a sequence number RAM and a channel ID RAM. The sequence number RAM stores information related to the order of the constituent time-slots for virtually concatenated channels. The channel ID RAM stores information that specifies the channel to which each time-slot belongs to.

Time-Slot Counter

Time-slot counter 112 includes a row counter, a column counter and a time-slot counter. These counters are used collectively to determine the position of the data on the Telecom bus within a SONET frame, thereby enabling the data to be demultiplexed to the correct time-slot.

Input Buffer

Input buffer 102 is adapted to remove overhead and fixed stuff bytes, therefore to enable only the data to pass through for each time-slot and to pre-align the bytes to w-byte words (w is four in the above example). Input buffer 102 receives and stores the payload for each incoming Telecombus data in the SONET/SDH SPE. Input buffer 102 then removes fixed stuff, transport overhead and path overhead from the data it receives.

Input buffer 102 is adapted to compensate for slightly different payload rate of the SONET/SDH time-slots by aligning each incoming time-slot to four-byte boundaries. Alignment is done to four byte boundaries because the data path of RVCP 100 is 32-bit wide. Single-byte granularity is used to compensate for differential payload rate which results in differential delay. Therefore input buffer 102 prealigns data to the same 4-byte boundary across all time-slots. In other words, input buffer 102 compensates for differential delay that is less than or equal to three bytes. Differential delays greater than, for example, 3 bytes are handles by the alignment logic 106, described below.

In order to align data to the same four-byte boundary across all time-slots, input buffer 102 uses a signal TCOM_SOF that is derived from signal TCOM_J1 and that marks the beginning of a SPE. When signal TCOM_SOF toggles, the write pointer for the input buffer 102 corresponding to the current time-slot is adjusted to a 4-byte boundary relative to the input buffer 102's read pointer. In other words, if input buffer 102 has between 0 and 3 bytes, then the write pointer is made the same as the read pointer. If input buffer 102 has between 4 and 7 bytes, then the write pointer is adjusted to be four more than the read pointer. Write pointer adjustment is carried out by making the two LSBs of the write pointer the same as those of the read pointer. The two LSBs of the read pointer need not be stored, since each reads provides a burst of 0 or 4 bytes. As described above, the time-slot interleaved data bytes stored in input buffer 102 are subsequently read by matrix transposer 104 such that the data as read and output by matrix transposer 104 are per-time slot data and further, the most significant byte of data output by matrix transposer is the first byte of the SPE when both signals IF_SOF and IF_VALID are asserted.

Depending on the mode of operation, each bank of input buffer 102 is adapted to include a number of logical queues. In the STS-1 mode, an input buffer 102 bank is adapted to include twelve queues, each having a depth of 8 bytes and each associated with a different one of the twelve STS-1 time-slots. In the STS-3c mode, an input buffer 102 bank is adapted to include four queues each having a depth of 24 bytes and each associated with a different one of the four STS-3c time-slots. For example, time-slots 0, 16 and 32 are all mapped to the same queue, namely queue 0. The mapping between STS-3c and STS-1 time-slot is shown in Table II below.

TABLE II

| STS-3c time-slot | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| STS-1 time-slot | 0 | 1 | 2 | 3 | 4 | 5 | 6 | 7 | 8 | 9 | 10 | 11 | 12 | 13 | 14 | 15 |
| | 16 | 17 | 18 | 19 | 20 | 21 | 22 | 23 | 24 | 25 | 26 | 27 | 28 | 29 | 30 | 31 |
| | 32 | 33 | 34 | 35 | 36 | 37 | 38 | 39 | 40 | 41 | 42 | 43 | 44 | 45 | 46 | 47 |

For contiguous concatenations, an STS-Nc que is treated as N/3 STS-3c queues. This enables input buffer 102 to handle any concatenation (e.g. STS-6c, STS-9c, STS-12c, ...). Moreover, because input buffer 102 treats contiguous concatenation traffic and virtual concatenation traffic similarly (e.g. an STS-15c frame looks like STS-3c-5v frame), the RVCP data path adapted for virtual concatenation processing may need only minor modification to support contiguous concatenation.

Alignment Logic

Alignment logic 106 is adapted to receive unaligned data (i.e., data having differential delays) that may have been multiplexed over multiple constituent time-slots from matrix transposer 104 and to generate, in response, aligned data at its output terminals. Relatively smaller differential delays, e.g., delays corresponding to 0 to 3 bytes, are compensated by input buffer 102. Therefore, data as they arrive at the input terminals of alignment logic 106 have been compensated for such relatively smaller differential delays (i.e., by input buffer 102). Alignment logic 106 compensates for relatively larger differential delays via an internal or an external memory (alternatively collectively referred to hereinbelow as the memory).

In one exemplary embodiment, the alignment logic 106 has a random access memory (RAM) disposed therein that includes a number of queues, each queue for an STS-1 or STS-3c time-slot, as shown in FIG. 9. As seen from FIG. 9, alignment logic 106 receives data from three STS-1 or STS-3c time-slots. When transmitted, data words are aligned across their three constituent time-slots. However, due to differential delay, and as shown in FIG. 9, while time-slot 200 receives data words $D_4$, $D_5$, $D_6$ and $D_7$, time-slot 202 receives data words $D_1$, $D_2$, $D_3$ and $D_4$, and time-slot 204 receives data words $D_6$, $D_7$, $D_8$ and $D_9$ Note that, for example, data $D_2$ of time-slot 202 is aligned with data $D_5$ of time-slot 200. Therefore, assuming that, e.g., data $D_1$ of times-slot 200 is to be aligned with data $D_1$ of times-slot 202 and data $D_1$ of times-slot 204, etc., it is seen that the data words of time-slots 200, 202 and 204 are not aligned at the input side of alignment logic 106.

Alignment logic 106 receives data for time-slots 200, 202, 204 and, in response, generates data for time-slots 206, 208, 210. As seen from FIG. 9, data $D_1$ of time-slots 206, 208 and 210 output by alignment logic 106, are aligned. Similarly, data $D_2$, $D_3$ and $D_4$ of time-slots 206, 208 and 210 output by alignment logic 106 are also aligned.

Alignment logic 106 may be adapted to align the data it receives either at the write side (i.e., during writing of the data) or the read side (i.e., during reading of the data). In one embodiment, alignment logic 106 writes the data in the memory in such order that the written data are aligned when read from the memory. In other words, when alignment is done on the write side, data is written into addresses in such manner that when read out sequentially, they are aligned. As described above, by aligning the data on the write side, the constituent time-slots are aligned when the data is read.

Synchronization of Constituent Time-Slots

As described above, the alignment logic aligns data before writing it into the memory. No data is read from the memory until all the constituent time-slots have received frames with the same MFI. Alignment logic 106 performs synchronization, thereby enabling the readout of the data from the memory.

As is known, a MFI is a number which specifies the frame index. All the constituent time-slots of a frame depart the transmitting end with the same MFI at the transmit end. However, as these different time-slots travel through different paths with different delays, data belonging to different time-slots may arrive at the receiving end with different MFIs. A faster time-slot (i.e., one which goes through a path with shorter delay) typically arrives at the receiving end with an MFI that is larger than those of the slower time-slots.

Each constituent time-slot has an associated RAM address in the alignment logic 106 adapted to compensate for differential delays. When an MFI is received, it is mapped to a RAM write pointer. Thereafter, the data associated with the received MFI is written to the address pointed to by the corresponding RAM write pointer.

The above embodiments of the present invention are illustrative and not limitative. For example, the invention is not limited by the number or type of channels that are concatenated. Nor is the invention limited to the type of traffic flowing through the channels. The invention is not limited by the type of hardware or software adapted to perform the above inventions. Furthermore, it is understood that the above inventions may be performed by either software modules, hardware modules or a combination of both. Other variations, modifications, additions, deletions, and equivalents will be apparent to a person skilled in the art and are intended to fall within the scope of the appended claims.

What is claimed is:

1. A receive virtual concatenation processor comprising:
an input buffer adapted to receive and store time-slot interleaved data portions flowing through concatenated channels; wherein said concatenated channels include contiguously and virtually concatenated channels;
a matrix transposer adapted to read the time-slot interleaved data portions stored in the input buffer and to output per time-slot data portions;
a marriage network adapted to convert the per time-slot data portions to per-channel data portions;

an alignment logic adapted to align the per time-slot data portions which are misaligned by more than a predefined number of time-slots;

a time-slot counter adapted to count a time-slot associated with each of the data portions of the time-slot interleaved data; wherein the input buffer and the matrix transposer are cooperatively adapted to align the time-slots which are misaligned only by less than the predefined number of time-slots; and a memory.

2. The receive virtual concatenation processor of claim 1 further comprising:

a path AIS alarm handler adapted to receive an AIS alarm for a time-slot interleaved data portion and to disable a channel associated with the data portion.

3. The receive virtual concatenation processor of claim 1 further comprising:

an MFI&SQ extractor adapted to parse an H4 byte disposed in a path overhead of each of SONET frames.

4. The receive virtual concatenation processor of claim 3 wherein said time-slot interleaved data are received by the receive virtual concatenation processor via SONET frames carrying STS-12N traffic, wherein N is a multiple integer of four.

5. The receive virtual concatenation processor of claim 4 wherein said concatenated channels include contiguously concatenated channels.

6. The receive virtual concatenation processor of claim 5 wherein the contiguously concatenated channels are adapted to carry STS-Mc traffic, wherein M is a multiple integer of three and greater than zero.

7. The receive virtual concatenation processor of claim 4 wherein said concatenated channels include virtually concatenated channels.

8. The receive virtual concatenation processor of claim 7 wherein said receive virtual concatenation processor is adapted to map each portion of data received from the virtually concatenated channels to a time-slot associated with STS-1 traffic to form STS-1-Mv traffic, where M is an integer greater than zero.

9. The receive virtual concatenation processor of claim 8 wherein each data portion is a data byte.

10. The receive virtual concatenation processor of claim 9 further comprising:

a calendar in accordance with which the receive virtual concatenation processor supplies the per channel data.

11. The receive virtual concatenation processor of claim 10 wherein said calendar is programmable.

12. The receive virtual concatenation processor of claim 10 wherein the receive virtual concatenation processor comprises a number of input terminals each adapted to receive a data stream of time-slot interleaved associated with one channel.

13. The receive virtual concatenation processor of claim 7 wherein said receive virtual concatenation processor is adapted to map each portion of data received from the virtually concatenated channels to a time-slot associated with STS-3c traffic to form STS-3c-Mv traffic, where M is an integer greater than zero.

14. The receive virtual concatenation processor of claim 13 wherein each data portion is a data byte.

15. The receive virtual concatenation processor of claim 7 wherein said receive virtual concatenation processor is adapted to map a first portion of data received from the virtually concatenated channels to a time-slot associated with STS-1 traffic to form STS-1-Mv traffic and further to map a second portion of data received from the virtually concatenated channels to a time-slot associated with STS-3c traffic to form STS-3c-Ov traffic, wherein M and O each is an integer greater than zero.

16. The receive virtual concatenation processor of claim 15 wherein each data portion is a data byte.

17. The receive virtual concatenation processor of claim 4 wherein said concatenated channels include both contiguously and virtually concatenated channels.

18. The receive virtual concatenation processor of claim 1 wherein the input buffer is further adapted to remove overhead and fixed stuff of each received SONET frame.

19. The receive virtual concatenation processor of claim 1 wherein said time-slot interleaved data is received via a single data path.

* * * * *